(12) United States Patent
Eda

(10) Patent No.: US 7,708,449 B2
(45) Date of Patent: May 4, 2010

(54) ILLUMINATION DEVICE AND LIQUID CRYSTAL DISPLAY APPARATUS

(75) Inventor: Osamu Eda, Azumino (JP)

(73) Assignee: Epson Imaging Devices Corporation (JP)

( * ) Notice: Subject to any disclaimer, the term of this patent is extended or adjusted under 35 U.S.C. 154(b) by 0 days.

(21) Appl. No.: 11/695,209

(22) Filed: Apr. 2, 2007

(65) Prior Publication Data

US 2008/0037285 A1 Feb. 14, 2008

(30) Foreign Application Priority Data

Apr. 3, 2006 (JP) .............................. 2006-101624

(51) Int. Cl.
*F21V 7/04* (2006.01)
(52) U.S. Cl. ................................. 362/631; 362/249.03
(58) Field of Classification Search ......... 362/630–631, 362/249, 646; 257/98–99; 349/58, 150
See application file for complete search history.

(56) References Cited

U.S. PATENT DOCUMENTS

| | | | | |
|---|---|---|---|---|
| 6,605,357 | B1 * | 8/2003 | Miyake et al. .............. | 428/420 |
| 6,806,920 | B2 * | 10/2004 | Hayashi et al. ............... | 349/58 |
| 2005/0018102 | A1 * | 1/2005 | Hirano ......................... | 349/58 |
| 2005/0145595 | A1 * | 7/2005 | Cubero Pitel ................ | 216/13 |
| 2005/0179850 | A1 * | 8/2005 | Du ............................. | 349/150 |
| 2005/0286008 | A1 * | 12/2005 | Miyagawa et al. .......... | 349/158 |
| 2006/0152664 | A1 * | 7/2006 | Nishio et al. ................ | 349/150 |

FOREIGN PATENT DOCUMENTS

JP          2005-294172          10/2005

* cited by examiner

*Primary Examiner*—Jong-Suk (James) Lee
*Assistant Examiner*—Julie A Shallenberger
(74) *Attorney, Agent, or Firm*—Harness, Dickey & Pierce, P.L.C.

(57) ABSTRACT

An illumination device includes a light source member, a flexible wired board the light source member mounted thereon and a wiring provided thereon, and a structure to be stuck to the wired hoard via sticking members at a plurality of sticking surfaces, wherein one end of the wiring provided on the wired board is electrically connected to and terminated at the light source member, and the other end of the wiring is provided with a connecting path to be electrically connected to the outside, and wherein the bond strength of the plurality of sticking surfaces is set in such a manner that the bond strength of the sticking surface located on the one end side of the wiring is lower than that of the sticking surface located on the other end side of the wiring.

13 Claims, 9 Drawing Sheets

ILLUMINATION DEVICE AND LIQUID CRYSTAL DISPLAY APPARATUS

The entire disclosure of Japanese Patent Application No. 2006-101624, filed Apr. 3, 2006 is expressly incorporated by reference herein.

BACKGROUND

1. Technical Field

The present invention relates to an illumination device and a liquid crystal display apparatus, and more specifically, to an illumination device in which a wired board on which a light source member is mounted is stuck to a predetermined sticking surface and a liquid crystal display apparatus.

2. Related Art

In general, an illumination device which outputs light emitted from a light source to a predetermined direction by guiding the light by a light guide member formed of translucent material such as acrylic is known as an illumination device which outputs light emitted from a light emitting diode (hereinafter referred to as "LED"), which corresponds to the light source, to a predetermined direction.

Such illumination device is used as a backlight unit of a side light type in a liquid crystal display apparatus. The backlight unit of the side light type is mainly configured by disposing LEDs on side surfaces of a light guide panel of a flat plate shape, which corresponds to the light guide member, and outputs light emitted from the LEDs and incoming from the side surfaces of the light guide panel through a principal plane as an exit plane in a direction of the thickness of the light guide panel (in the direction of the normal line of the principal plane of the light guide panel). An optical sheet such as a diffuser panel and a prism sheet is disposed on the exit plane of the light guide panel to diffuse light outputted from the light guide panel substantially evenly into a plane.

In the liquid crystal display apparatus, a transmissive liquid crystal panel is disposed on an observer side of the backlight unit, so that light outputted from the backlight unit is modulated by the transmissive liquid crystal panel and is outputted toward the observer, so that display on the liquid crystal display apparatus is achieved.

In the backlight unit as the illumination device as described above, a flexible printed circuit board (hereinafter, referred to as "FPC") which is a flexible wired board having an LED mounted on a mounting surface thereof is used for the purpose of downsizing and weight reduction, and the FPC is stuck to a predetermined position of the backlight unit via the double-faced adhesive sheet (double-faced tape). A backlight unit having a configuration in which the FPC having the LEDs as the light sources mounted thereon is stuck to a predetermined position with the double-faced tape is disclosed as a surface illumination device in Japanese Unexamined Patent Application Publication No. 2005-294172.

In the backlight unit having the configuration in which the FPC having the LEDs mounted thereon is stuck to the predetermined position with the double-faced tape as disclosed in Japanese Unexamined Patent Application Publication No. 2005-294172, for example, when defects such as uneven luminance, entry of foreign substances, and deformation of a casing caused by displacement of the LEDs are found after having stuck the FPC, it is necessary to perform a rework for repairing the defects by separating the FPC once from the stuck double-faced tape. In this manner, when separating the FPC from the double-faced tape, the FPC, having flexibility, is deformed by a force applied thereto for separation from the double-faced tape. However, since electronic parts such as the LEDs mounted on the FPC have generally no flexibility if the FPC is deformed, an excessive stress is applied to soldered joint portions between terminals of the LEDs and the FPC, whereby separation or cracking occurs at the joint portions.

When the separation or cracking occurs at the joint portions with respect to the terminals of the LEDs, it is obliged to replace the FPC. Even though the cracking does not occur, application of an excessive stress to the terminals of the LEDs should be avoided since it may cause defective illumination of the LEDs.

SUMMARY

An advantage of some aspects of the invention is to provide an illumination device and a liquid crystal display apparatus in which application of an excessive stress to joint portions between terminals of LEDs and an FPC during rework is avoided.

An illumination device according to an aspect of the invention is an illumination device including: a light source member, a flexible wired board the light source member mounted thereon and a wiring provided thereon, and a structure to be stuck to the wired board via sticking members at a plurality of sticking surfaces, wherein one end of the wiring provided on the wired board is electrically connected to and terminated at the light source member, and the other end of the wiring is provided with a connecting path to be electrically connected to the outside, and wherein the bond strength of the plurality of sticking surfaces is set in such a manner that the bond strength of the sticking surface located on the one end side of the wiring is lower than that of the sticking surface located on the other end side of the wiring.

In this configuration, by peeling off the wired board stuck to the sticking surface of the structure from the one end side of the wiring (from the side which is connected to the light source) for rework, which is the side of the sticking member having the lower bond strength, an excessive stress is not applied to a joint portion between the LED as the light source member and the wired board.

Preferably, the sticking members are composed of a plurality of double-faced adhesive sheets having different bond strengths with respect to at least one of the structure and the wired board, and the double-faced adhesive sheet disposed at a position which is closest to the other end of the wiring has the highest-bond strength with respect to the structure or the wired board.

In this configuration, the sticking members may be configured with the double-faced adhesive sheets having different bond strengths, and hence the illumination device may be configured easily at low cost.

Preferably, the double-faced adhesive sheet disposed at the position which is closest to the other end of the wiring is disposed on the other end side of the wiring with respect to the light source member.

In this configuration, the double-faced adhesive sheet having the highest-bond strength is peeled off after positions on which the LEDs are mounted when peeling off the wired board for rework. Therefore, the positions of the wired board having the LEDs mounted are prevented from being bent, and hence application of an excessive stress to the joint portions between the LEDs and the wired board may be positively prevented.

Preferably, the bond strength of the double-faced adhesive sheets to stick the wired board to the structure is differentiated in such a manner that the double-faced adhesive sheet disposed at the position which is closest to the other end of the wiring demonstrates the highest-bond strength by differentiating the surface areas of the plurality of double-faced adhesive sheets to be stuck to the wired board and the structure.

In this configuration, the bond strength to stick the wired board can be varied to predetermined values, and hence the stresses to be applied to the wired board may be preferably well balanced so that the wired board is prevented from coming apart during normal use, and can be peeled off easily for rework.

Preferably, the bond strengths of the plurality of double-faced adhesive sheets with respect to at least one of the structure and the wired board include a first bond strength and a second bond strength, wherein only the double-faced adhesive sheet disposed at the position closest to the other end of the wiring has the first bond strength, wherein the first bond strength falls within a range from 15 to 20 N/20 mm according to 180° peel strength, and the second bond strength falls within a range from 1 to 5 N/20 mm according to 180° peel strength.

In this configuration, the aspect of the invention is accomplished only with the double-faced adhesive sheets having the two bond strengths, the illumination device may be configured at lower cost.

Preferably, the wired board is bent on a side of the other end of the wiring with respect to the double-faced adhesive sheets disposed on at the position which is closest to the other end of the wiring.

In this configuration, the wired board may be prevented from coming apart from the sticking surface by a reaction force of the wired board to be resiliently restored. Therefore, in the course of usage of the illumination device, generation of uneven luminance of the illumination device due to displacement of the light source member is prevented.

The liquid crystal display apparatus according to an aspect of the invention is characterized by the provision of the illumination device.

According to the configuration as described above, the number of defective units to be wasted due to failed rework during the manufacturing process may be reduced and, consequently, the liquid crystal display apparatus may be manufactured at low cost. Since generation of uneven luminance of the illumination light from the illumination device is prevented, high display quality images are provided stably.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
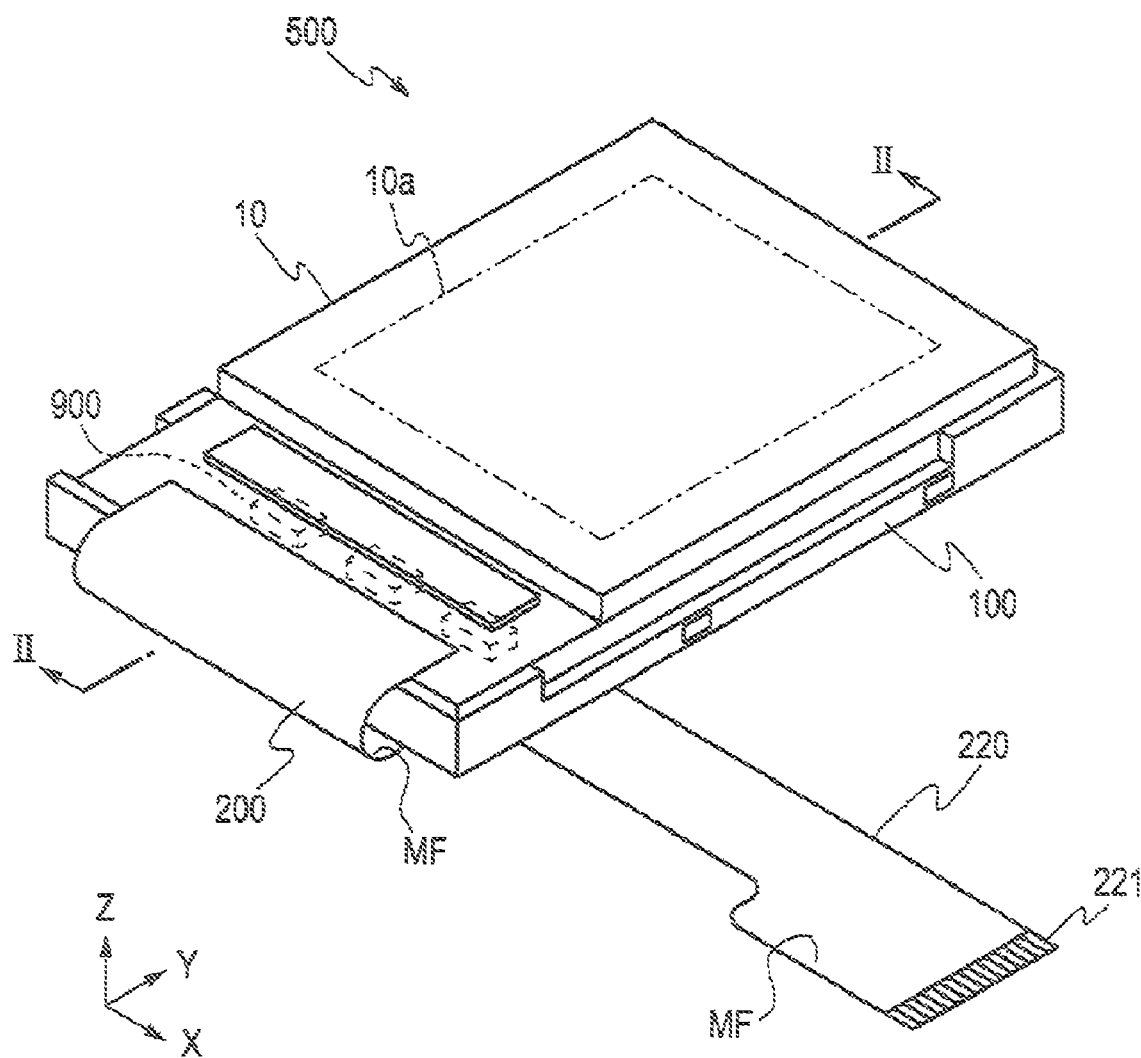
FIG. 1 is a perspective view of a liquid crystal display apparatus.
Figure 2:
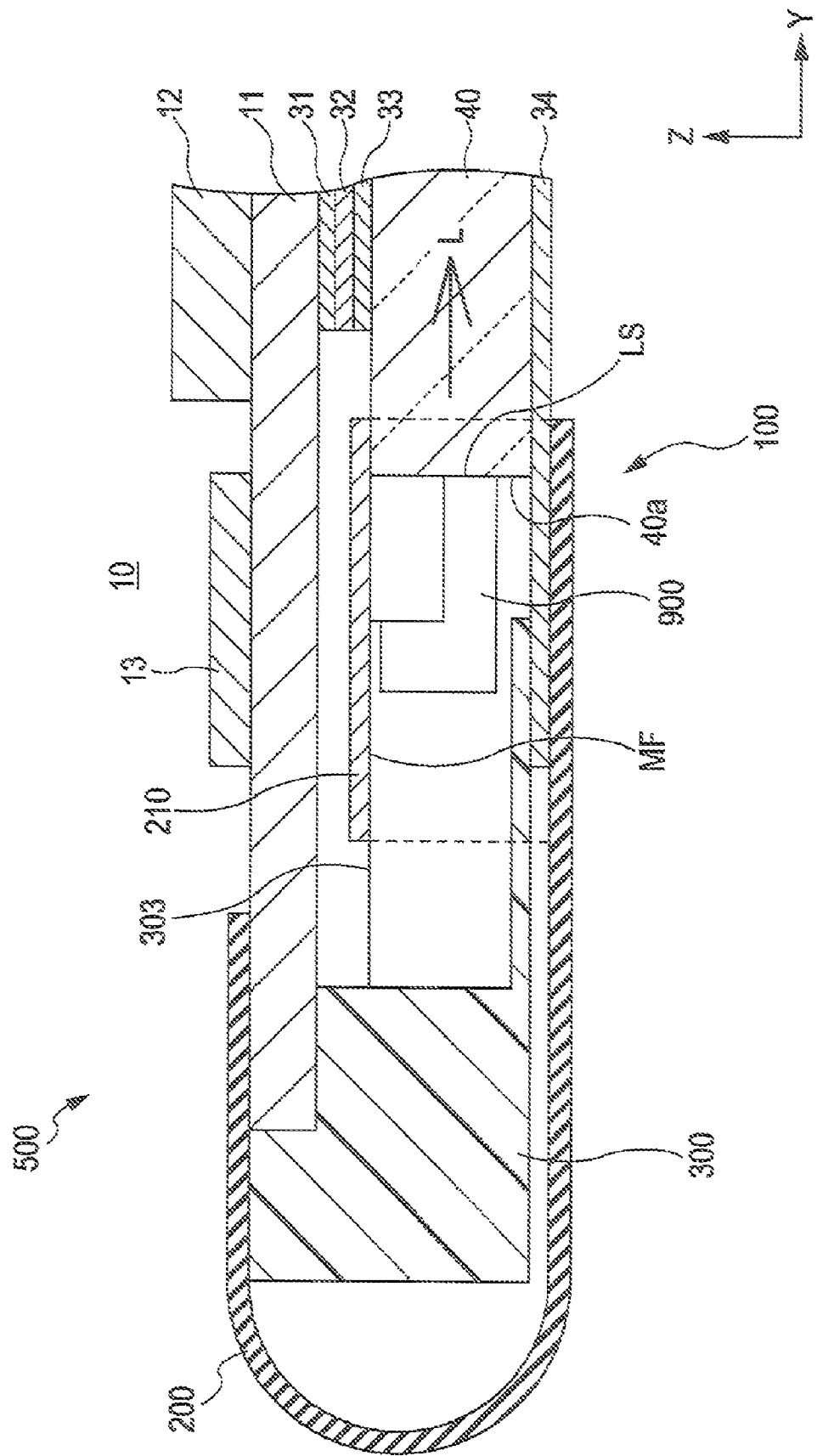
FIG. 2 is a cross-sectional view taken along the line II-II in FIG. 1.
Figure 3:
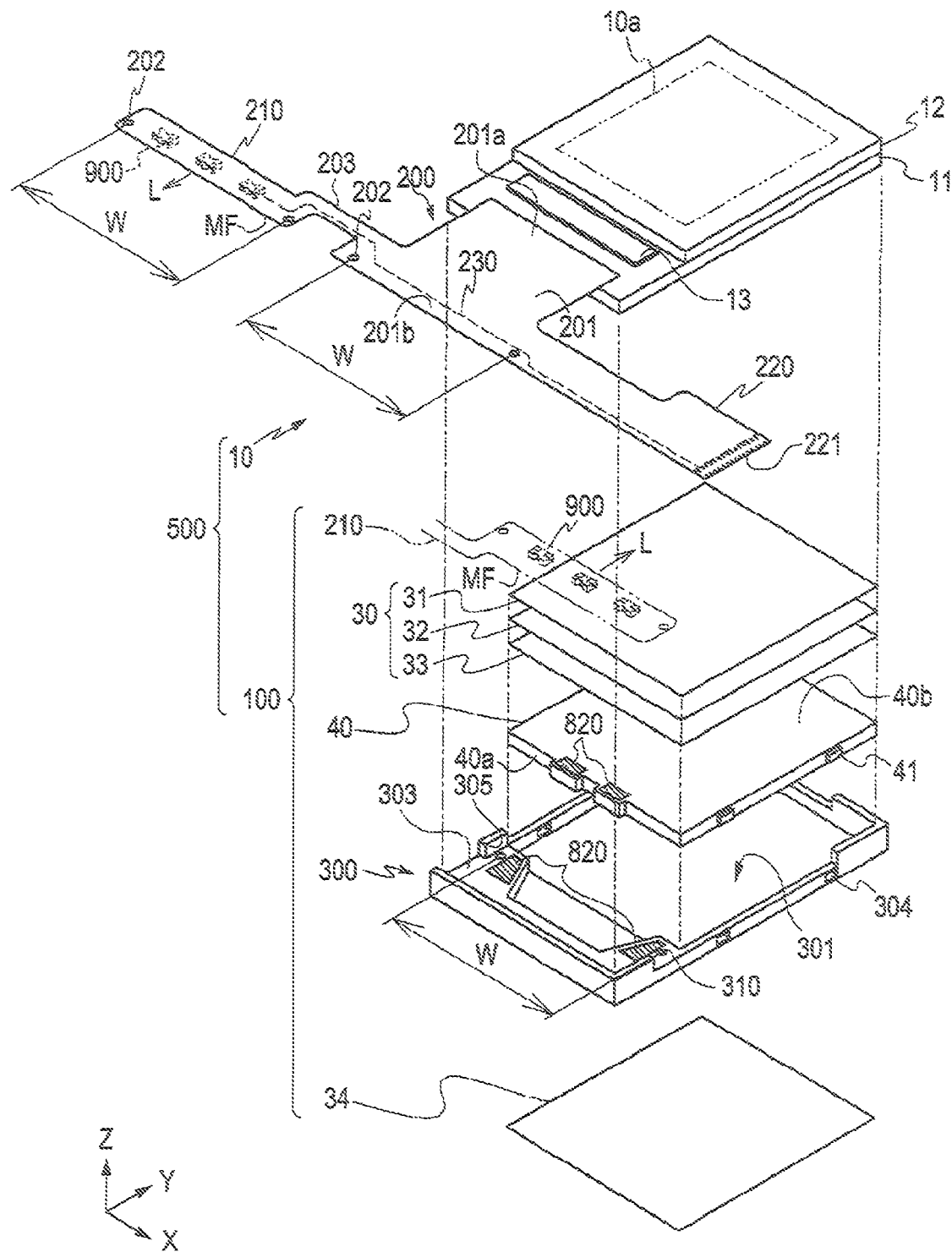
FIG. 3 is an exploded perspective view of the liquid crystal display apparatus.

Referring now to FIG. 1 to FIG. 5, an example in which an aspect of the invention is applied as a liquid crystal display apparatus and a backlight unit thereof will be described as a first embodiment. In the drawings used for description given below, the contraction scales of respective members are changed as needed in order to ensure the visibility of the respective members in the drawing. FIG. 1 is a perspective view of a liquid crystal display apparatus 500. FIG. 2 is a cross-sectional view taken along the line II-II in FIG. 1. FIG. 3 is an exploded perspective view of the liquid crystal display apparatus 500.

The liquid crystal display apparatus 500 in this embodiment is a so-called transmissive liquid crystal display apparatus including a transmissive liquid crystal panel 10, and a backlight unit 100 as an illumination device having light emitting diodes (hereinafter referred to as "LEDs") as light source members.

The liquid crystal display apparatus 500 in this embodiment includes the liquid crystal panel 10 and the backlight unit 100. As shown in FIG. 3, the liquid crystal panel 10 includes a first substrate 11 and a second substrate formed, for example, of glass or quartz, and liquid crystal sandwiched therebetween, and displays an image in a rectangular image display area 10a by modulating light entering the image display area 10a from the first substrate 11 side by changing alignment of the liquid crystal and outputting from the second substrate 12 side.

On the other hand, the backlight unit 100 in this embodiment is a device to distribute light emitted from LEDs 900 evenly in a plane in a rectangular area which is larger than the image display area 10a of the liquid crystal panel 10 and output the light toward the liquid crystal panel 10 as illumination light.

In the following description, an axis extending in parallel with the longitudinal direction of the image display area 10a in a plane in parallel with a surface of the second substrate 12 is referred to as "Y-axis", and a direction orthogonal to the Y-axis and parallel with the short side is referred to as "X-axis". An axis extending in parallel with the normal line of the surface of the second substrate 12 is referred to as "Z-axis". A view of respective members of the liquid crystal display apparatus 500 from a direction parallel with the Z-axis and from the second substrate 12 side of the liquid crystal panel 10 is referred to as "plan view".

The liquid crystal panel 10 in this embodiment is a liquid crystal panel of TFT active matrix drive system having a drive circuit integrated therein. On a surface of the first substrate 11 on the liquid crystal side, a TFT and scanning lines are formed as pixel switching positive elements, and an alignment film is formed on a pixel electrode after having formed wiring such as data lines. On the other hand, on the surface of the second substrate 12 on the liquid crystal side, and an opposed electrode is formed and an alignment film is formed on the uppermost layer thereof. The liquid crystal assumes a predetermined alignment according to a voltage applied to a pair of the alignment films. According to the alignment of the liquid crystal, polarization of light entering from the first substrate 11 side and outgoing from the second substrate 12 side changes.

On the first substrate 11 on the light incident side and the second substrate 12 on the light exit side, polarizing films, phase-difference films, and polarizing plate (not shown) are arranged in predetermined directions depending on an operation mode such as TN (Twisted Nematic) mode, STN (Super TN) mode, D-STN (Double-STN) mode, VA (vertical alignment) mode, or depending on whether it is a normally white mode or a normally black mode.

In this embodiment, the liquid crystal panel 10 employs a transmissive liquid crystal panel of TFT active matrix drive system. However, the liquid crystal panel 10 may be configured in an arbitrary drive system and lighting system. For example, the liquid crystal drive system may be a simple matrix drive system, or the lighting system may be of a transflective system. When the drive system of an active matrix system is employed in the liquid crystal panel, the liquid crystal panel may be the one employing a TFD as a positive element.

The first substrate 11 has a portion extending to one side in the Y direction when viewed from the direction of the normal line of the second substrate 12 (in plan view) with respect to the second substrate 12 and, on the surface of the extended portion on the second substrate 12 side, a drive IC 13 as a drive circuit and an external connecting terminal are formed. The external connecting terminal is provided with a flexible printed circuit board (hereinafter referred to as "FPC") 200 as a flexible wired board mounted thereon.

The FPC 200 is a wired board in the form of a flexible film configured with a predetermined conductive pattern on the surface or in the middle of a multi-layered insulative film member such as polyimide. The FPC 200 in this embodiment is formed with the conductive pattern exposed only on a mount face MF, which is one of the surfaces, and is formed with wiring in an intermediate layer. The FPC 200 is formed with a terminal on the mount face MF of a proximal portion 201a of the liquid crystal panel 10 side, and the terminal is connected with an external connecting terminal of the liquid crystal panel 10 with isotropic conductive adhesive agent.

As shown in FIG. 3, the FPC 200 has a substantially T-shape including a base portion 201 extending from the proximal portion 201a in parallel with the Y-axis in plan view, and extending in the direction away from the liquid crystal panel 10, and portions extending respectively from a distal portion 201b of the base portion 201 to both sides in parallel with the X-axis in a state of being developed on an XY plane without being bent.

As regards the portions of the FPC 200 extending to the both sides in parallel with the X-axis, assuming that the direction in parallel with the Y-axis in plan view is a vertical direction, and hence the distal portion 201b of the base portion 201 thereof is a lower portion, a portion extending leftward, which is one direction, from the distal portion 201b is a LED-FPC portion 210, and a portion extending rightward, which is the other direction, from the distal portion 201b is a connector section 220.

The three LEDs 900 are arranged and mounted in one direction parallel with the X-axis on the mount face MF of the LED-FPC portion 210 of the FPC 200. The LEDs 900 each are a surface-mounted chip LED of so-called a side view type (side light emitting type) having a light-emitting surface LS which is substantially orthogonal to the mount face MF of the FPC 200, and emitting light in parallel with the mount face MF. In this embodiment, as shown in FIG. 3, in the state in which the FPC 200 is developed on the XY plane without being bent, the LEDs 900 are each mounted with the light-emitting surface LS of the LED 900 extending in substantially parallel with an XZ plane and facing the opposite direction from the proximal portion 201a on the liquid crystal panel 10 side of the FPC 200. That is, in the state in which the FPC 200 is developed on the XY plane without being bent, the outgoing direction L of light emitted from the LED 900 is substantially parallel with the Y-direction, and also is a direction away from the liquid crystal panel 10. The LED 900 emits white light in this embodiment.

The LED 900 may be a type other than the white light, which emits monochromatic light having other wavelengths, and may be so-called a multi-color LED chip which includes a plurality of light emitting diodes having a plurality of different wavelengths integrated in one chip.

The LED-FPC portion 210 includes a folded portion 203, which is formed to be thinner than the portion having the LEDs 900 mounted along the direction parallel with the Y-axis in plan view, on the proximal portion thereof. The FPC 200 is bent and folded at the folded portion 203 as described later.

On the other hand, the external connecting terminal of the liquid crystal panel 10 and an external connector terminal 221 electrically connected to the LED 900 of the LED-FPC portion 210 via the wiring are formed on a mount face MF at the distal portion of the connector section 220 of the FPC 200. The liquid crystal panel 10 and the LEDs 900 are electrically connected to and driven by an external device via the external connector terminal 221.

That is, a plurality of LED wirings 230 as the wirings, each electrically connected at one end to the LED 900 mounted on the mount face MP of the LED-FPC portion 210 and terminated at the LED 900, are extended toward the connector section 220 from the one end, and electrically connected at the other end to the external connector terminal 221, which is a connecting path to be electrically connected to the outside. Therefore, in other words, the folded portion 203 formed by bending and folding the FPC 200 is formed on the other end side of the LED wirings 230 with respect to the LEDs 900 mounted on the mount face MF of the LED-FPC portion 210.

The distal portion 201b of the base portion 201 of the FPC 200, which is a portion extending from the liquid crystal panel 10 in the direction parallel with the Y-axis is formed with two reference holes 202 as circular through holes formed to be apart from each other by a distance W in the direction parallel with the X-axis. In addition, the LED-FPC portion 210 is also formed with two reference holes 202 apart from each other by the distance W in the direction parallel with the X-axis. These four reference holes 202 are arranged on the same straight line parallel with the X-axis.

The LED-FPC portion 210 of the FPC 200 and the LEDs 900 are parts of the members which constitutes the backlight unit 100 as described later. However, in this embodiment, for the purpose of downsizing, reduction of the number of components, and reduction of the number of assembly steps of the liquid crystal display apparatus 500, these are formed integrally with the FPC 200 of the liquid crystal panel 10. Therefore, the LEDs 900 and the substrate on which the LEDs 900 are arranged and mounted may be formed separately from the FPC 200, and provided in the backlight unit 100, described later.

On the other hand, as shown in FIG. 2 and FIG. 3, the backlight unit 100 includes a light guide panel 40 as a light guide member, an optical sheet 30, a reflection sheet 34, the LED-FPC portion 210 described above, and a frame 300 as a structure for holding and storing these members.

The light guide panel 40 is a member of substantially flat plate shape of substantially rectangular shape in plan view formed to be larger than the image display area 10a of the liquid crystal panel 10, and is mainly formed of transparent or translucent light transmissive material. The light guide panel 40 of the substantially flat plate shape, being formed of acrylic resin, serves to distribute light entering from an entrance plane 40a as one side surface into a surface in plan view, and outputs the same from the exit plane 40b as a principal plane of the flat plate. The both side surfaces of the light guide panel 40 which are parallel with the Y-axis are formed with locking claws 41 so as to project therefrom for being fixed to the frame 300, described later, two on each surface.

The optical sheet 30 includes a diffuser panel 33, a prism sheet X 22 and a prism sheet Y 31, which are sheet-shaped members formed into the same shape of substantially rectangular shape in plan view respectively, and overlaid together. The diffuser panel 33 serves to make the luminance distribution of the outputted light uniform in the direction of the XY plane by diffusing transmitted light by the nature or the surface shape of the component material. The prism sheet X 32 and the prism sheet Y 31 each include prisms of substantially triangle shape in cross-section extending straight along the X-axis and the Y-axis respectively arranged in parallel, and have a purpose to enhance the strength of outputted light in a predetermined direction by aligning the outgoing direction of the transmitted light.

The optical sheet 30 includes the prism sheet X 32 sandwiched between the diffuser panel 33 and the prism sheet Y 31, so as to make the luminance distribution of light entering from the diffuser panel 33 side uniform in the direction of the XY plane, and output the light from the prism sheet Y 31 side with the outgoing direction aligned. The reflection sheet 34 is a sheet-type member formed with a mirror surface that reflects light on the surface on the light guide panel 40 side.

It is also possible to configure the back light unit 100 having no optical sheet 30 by providing the light guide panel 40 with the same function as the optical sheet 30.

The frame 300 is a frame-shaped member formed of resin and has an opening 301 as a substantially rectangular opening having the substantially the same shape as the peripheral shape of the light guide panel 40 in plan view, and is formed by resin molding. The opening 301 of the substantially rectangular shape is formed with engaging holes 304 as through holes two each on both side surfaces extending in parallel with the Y-axis. The light guide panel 40 is stored in and fixed to the opening 301 of the frame 300 by engagement of the locking claws 41 of the light guide panel 40 with the engaging holes 304.

In a state in which the light guide panel 40 is fixed to the frame 300, the optical sheet 30 is stuck to the exit plane 40b of the light guide panel 40, and the reflection sheet 34 is stuck to the principal plane side, which is opposite from the exit plane 40b of the right guide panel 40 with a mirror portion thereof faced toward the light guide panel 40.

The frame 300 is formed with a FPC fixing surface 303 as a flat plane portion positioned on a plane substantially the same as the exit plane 40b of the light guide panel 40 on one side of the opening 301 in the direction parallel with the Y-axis in plan view. The FPC fixing surface 303 is a sticking surface for sticking the LED-FPC portion 210 via the double-faced adhesive sheet as sticking means. On the FPC fixing surface 303 of the frame 300 in plan view, two reference holes 310 as circular through holes are formed at positions apart from each other by the distance W in the direction parallel with the X-axis. The inner diameter of the reference holes 310 is substantially the same as the reference holes 202 formed on the FPC 200.

The frame 300 of the backlight unit 100 is formed with a liquid crystal fitting portion 305 in which the outer periphery of the liquid crystal panel 10 is fitted. In a state in which the liquid crystal panel 10 is fitted in the liquid crystal fitting portion 305, the image display area 10a of the liquid crystal panel 10 and the exit plane 40b of the light guide panel 40 are completely overlapped with each other.

Figure 4A:
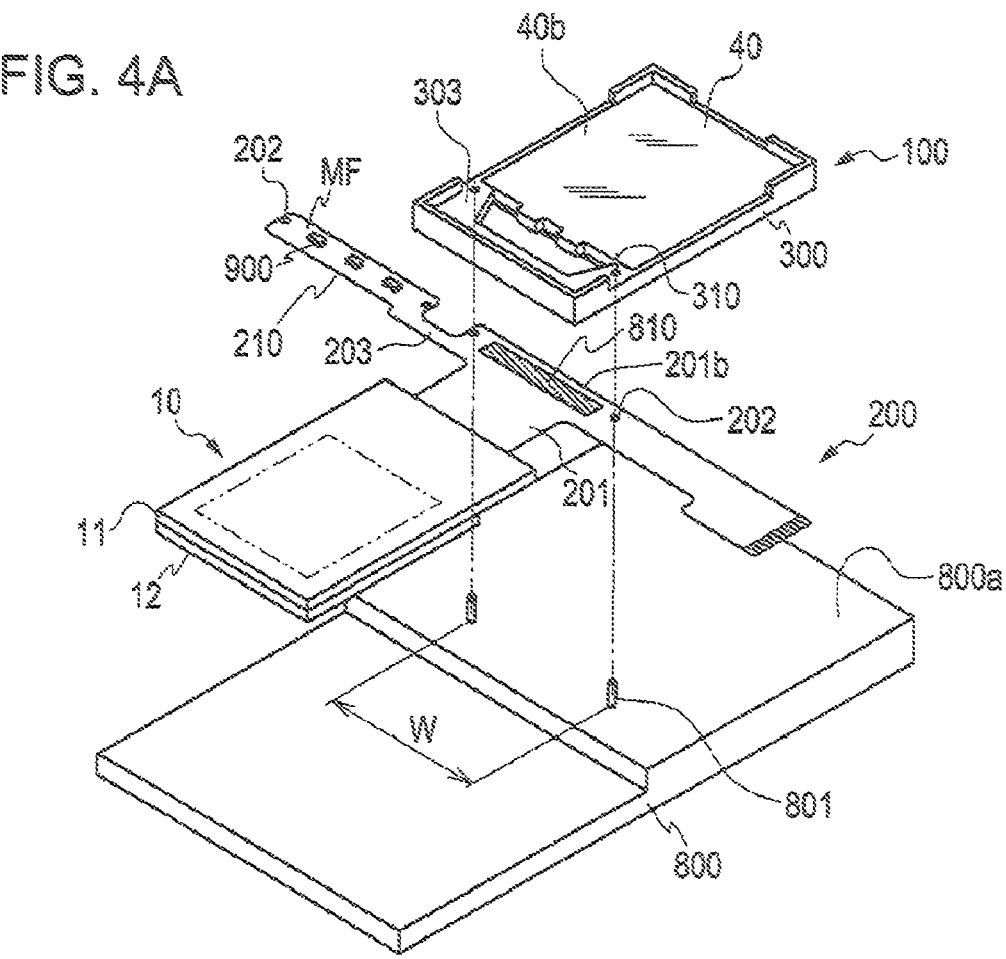
FIGS. 4A and 4B illustrates how to assemble a liquid crystal panel and an FPC.
Figure 4B:
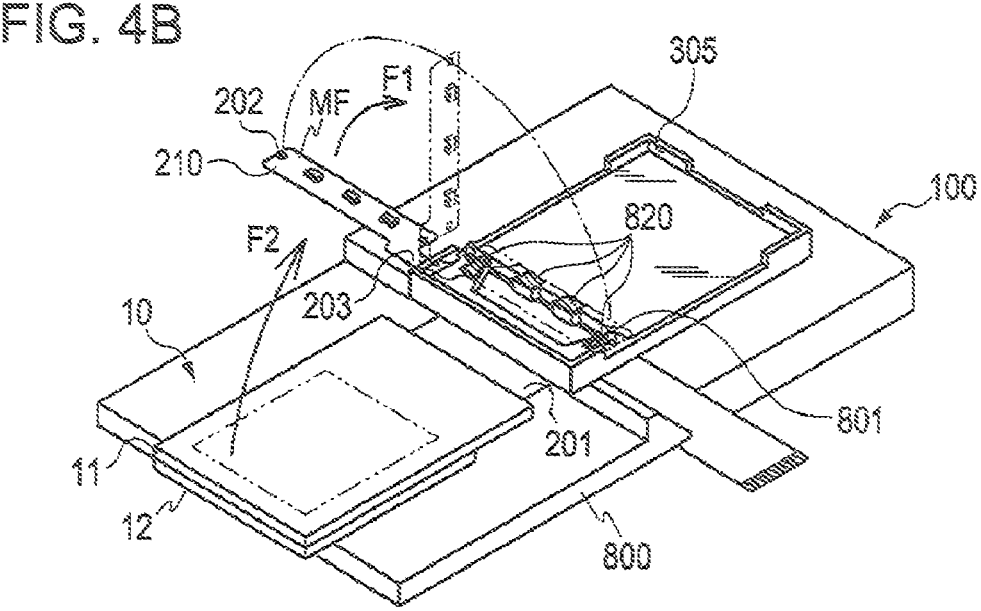

Referring now to FIGS. 4A and 4B, how to fit the FPC 200 when assembling the liquid crystal panel 10 and the backlight unit 100 will be described. FIGS. 4A and 4B illustrate how to assemble the liquid crystal panel 10 and the FPC 200.

The liquid crystal panel 10 and the backlight unit 100 are assembled with a jig 800 in the form shown in FIG. 4A. The jig 800 includes a jig top plane 800a as a flat plane and two column-shaped positioning pins 801 formed so as to project in the direction substantially orthogonal to the jig top plane 800a and arranged so as to apart from each other by the distance W. The positioning pins 801 have an outer diameter which enables to be fitted into the reference holes 310 formed on the frame 300 of the backlight unit 100 and the reference holes 202 formed on the FPC 200 of the liquid crystal panel 10 with a predetermined clearance.

When assembling the liquid crystal pane 10 and the backlight unit 100, firstly, the liquid crystal panel 10 is placed on the jig top plane 800a with the second substrate 12 faced downward, that is, with the surface of the second substrate 12 on the opposite side from the liquid crystal. At this time, the positioning pins 801 of the jig 800 are inserted into the two reference holes 202 formed on the distal portion 201b of the base portion 201 of the FPC 200. In this state, the mount face MF of the FPC 200 is faced upward.

Subsequently, a double-faced adhesive sheet 810 is stuck to the mount face MF side of the FPC 200 between the two reference holes 202 on the base portion 201.

Then, the backlight unit 100 is placed on the FPC 200 of the liquid crystal panel 10 so that the positioning pins 801 are inserted into the two reference holes 310 of the frame 300 with the exit plane 40b of the light guide panel 40 of the backlight unit 100 faced upward. At this time, the backlight unit 100 is placed so that the first substrate 11 of the liquid crystal panel 10 and the light guide panel 40 of the backlight unit 100 are positioned on both sides of a segment connecting the two positioning pins 801 in plan view. With this work, the mount face MF of the distal portion 201b of the base portion 201 of the FPC 200 and the lower surface of the frame 300 of the backlight unit 100 are stuck to each other with the double-faced adhesive sheet 810 in a state of being fixed in relative position by the positioning pins 801.

Subsequently, as shown in FIG. 4B, the LED-FPC portion 210 of the FPC 200 is folded back at the folded portion 203 so that the mount face MF comes inside (in the direction indicated by an arrow F1 in the drawing) and the LED-FPC portion 210 is stuck and fixed to the FPC fixing surface 303 and the exit plane 40b of the light guide panel 40 as the predetermined sticking surfaces with a plurality of double-faced adhesive sheets 820. At this time, the LED-FPC portion 210 is fixed so that the positioning pins 801 are inserted into the two reference holes 202 of the LED-FPC portion 210 respectively. Accordingly, the LEDs 900 are positioned with respect to the entrance plane 40a of the light guide panel 40.

Subsequently, the liquid crystal panel 10 is folded at the base portion 201 of the FPC 200 so that the first substrate 11 comes inside (in the direction indicated by an arrow F2 in the drawing), and the liquid crystal panel 10 is fitted and fixed into the liquid crystal fitting portion 305 of the frame 300.

Figure 5:
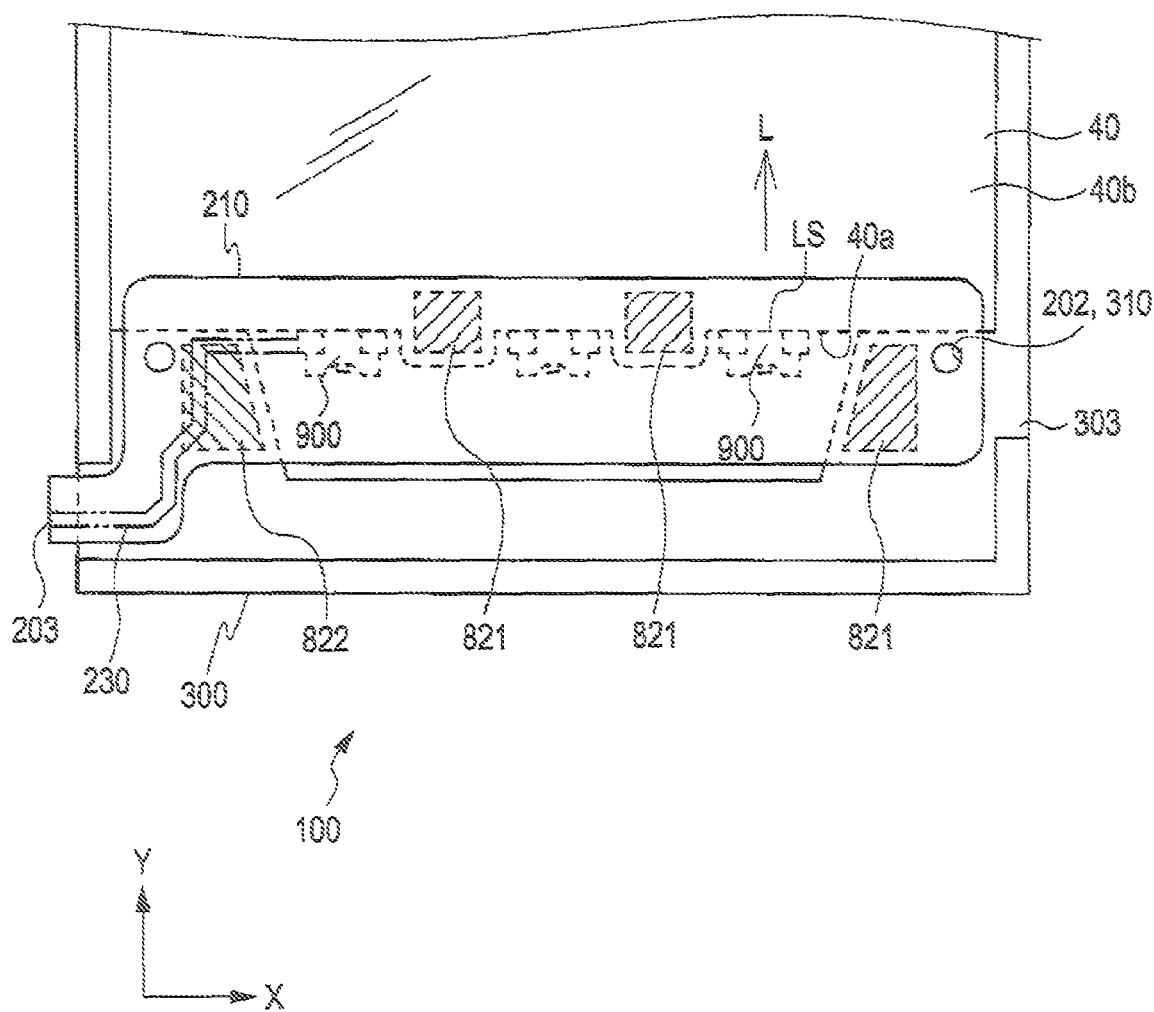
FIG. 5 is a partly enlarged view of a backlight unit viewed from the direction of the normal line of an exit plane.

By bending and fitting the FPC 200 according to the procedure shown above, the LED-FPC portion 210 of the FPC 200 connected to the first substrate of the liquid crystal panel 10 is stuck and fixed to the predetermined sticking surface of the backlight unit 100, and furthermore, the liquid crystal panel 10 and the backlight unit 100 are assembled, so that the liquid crystal display apparatus 500 shown in FIG. 5 is completed.

The LED-FPC portion 210 of the FPC 200 fitted as described above is stuck and fixed to FPC fixing surface 303 and the exit plane 40b of the light guide panel 40 with the double-faced adhesive sheet 820 in a state in which the mount face MF faced on the opposite side from the liquid crystal panel 10, that is, in a state in which the mount face MF is opposed to the exit plane 40b of the light guide panel 40. In this state, the light-emitting surfaces LS of the LEDs 900 mounted on the mount face MF of the LED-FPC portion 210 face the entrance plane 40a of the light guide panel 40 as shown in FIG. 2.

In the backlight unit 100 in the above-described embodiment, light emitted from the light-emitting surfaces LS of the LEDs 900 in the outgoing direction L enters from the entrance plane 40a into the light guide panel 40. The light entering the light guide panel 40 is guided in the light guide panel 40, diffused, and outputted from the exit plane 40b in a plane. The luminance distribution of the light outputted from the light guide panel 40 in the direction of the XY plane is made substantially even by the optical sheet 30, and outputted as the illumination light toward the liquid crystal panel 10.

As shown in FIG. 1, the liquid crystal display apparatus 500 in this embodiment is configured in such a manner that the liquid crystal panel 10 is fitted into the liquid crystal fitting portion 305 of the backlight unit 100 and is fixed by the double-faced adhesive sheet or the like. The image display area 10a of the liquid crystal panel 10 disposed in the outgoing direction of the illumination light is illuminated by the illumination light outputted from the backlight unit 100 having a luminance distribution substantially uniform in the direction of the XY plane.

Referring now to FIG. 5, a configuration of the backlight unit 100 in this embodiment in which the LED-FPC portion 210 which is the wired board on which the LEDs 900 are mounted is stuck and fixed to the FPC fixing surface 303 and the exit plane 40b of the light guide panel 40 will be described in detail. FIG. 5 is an enlarged view of the backlight unit 100 viewed from the direction of the normal line of the exit plane 40b.

In FIG. 5, an areas shown by oblique hatching inclining upward to the right and downward to the right represent portions where the double-faced adhesive sheets as adhesive members being interposed between the LED-FPC portion 210 and the FPC fixing surface 303 and the exit plane 40b of the light guide panel 40 for sticking the both members are disposed. The double-dashed lines in FIG. 5 represent the wirings 230 each electrically connected at the one end thereof with the LED 900.

As shown in FIG. 5, the FPC fixing surfaces 303 formed on the frame 300 are disposed on both sides of a side of the light guide panel 40 formed with the entrance plane 40a in plan view so as to come into contact with the side. The FPC fixing surface 303 is positioned on the plane substantially the same as the exit plane 40b of the light guide panel 40 stored and fixed in the frame 300 as described above.

The LED-FPC portion 210 is arranged so as to overlap with a part of the FPC fixing surface 303 and a part of the exit plane 40b respectively in plan view by positioning the reference holes 202 and the reference holes 310 formed on the FPC fixing surface 303 of the frame 300 substantially concentrically.

A low-bond strength adhesive sheet 821 and a high-bond strength adhesive sheet 822, which are double-faced adhesive sheet having adhesivity on both faces are interposed between the LED-FPC portion 210, and the FPC fixing surface 303 and the exit plane 40b, and at four positions in the areas where both surfaces are overlapped in plan view, so that the LED-FPC portion 210 is stuck to the FPC fixing surface 303 and the exit plane 40b. In other words, the LED-FPC portion 210 is stuck to the FPC fixing surface 303 and the exit plane 40b, which are the sticking surface of the frame 300 as a structure and the light guide panel 40 also as a structure with the double-faced adhesive sheets. The double-faced adhesive sheets are disposed at a plurality of positions and include the low-bond strength adhesive sheets 821 and the high-bond strength adhesive sheet 822.

More specifically, the high-bond strength adhesive sheet 822 is disposed on the portion on the folded portion 203 side of the LED-FPC portion 210 from between the two areas on the FPC fixing surface 303 which overlap with the LED-FPC portion 210 in plan view, and the low-bond strength adhesive sheets 821 are disposed on the other portions on the distal portion 211 side of the LED-FPC portion 210. The low-bond strength adhesive sheets 821 are disposed at two positions respectively between the adjacent LEDs 900 of the three LEDs 900 arranged in the direction parallel with the X-axis in the area where the exit plane 40b of the light guide panel 40 and the LED-FPC portion 210 are overlapped in plan view.

That is, either the low-bond strength adhesive sheets 821 or the high-bond strength adhesive sheet 822 are arranged on both sides of each of the three LEDs 900 arranged in the direction parallel with the X-axis in plan view, and the LED-FPC portion 210 is stuck and fixed with these double-faced adhesive sheets at these four positions. In this manner, by sticking the LED-FPC portion 210 on the both sides of the LEDs 900, the LED-FPC portion 210 is prevented from rising upward from the frame 300 and the exit plane 40b, whereby the LEDs 900 may be positioned with respect to the entrance plane 40a of the light guide panel 40 positively and firmly.

The low-bond strength adhesive sheet 821 and the high-bond strength adhesive sheet 822 demonstrate different bond strengths on the adhesive surface with respect to the LED-FPC portion 210, and the high-bond strength adhesive sheet 822 demonstrates a higher-bond strength. In this embodiment, the bond strength is defined by a 180° peel strength specified by JIS Z 0237. The entire disclosure of Japanese Industrial Standards (JIS) Z0237:2000, "Testing method of pressure-sensitive adhesive tapes and sheets", section 10 to 10.6 is expressly incorporated by reference herein. The 180° peel strength of the low-bond strength adhesive sheet 821 is 1 to 5 N/20 mm, and the 180° peel strength of the high-bond strength adhesive sheet 822 is 15 to 20 N/20 mm. In this manner, the double-faced adhesive sheets having different bond strengths are known and may be selected from the commercially available double-faced adhesive sheets.

In other words, in this embodiment, the LED-FPC portion 210 on which the LEDs 900 are mounted is stuck and fixed to the FPC fixing surface 303, which is the sticking surface of the structure and the exit plane 40b, which is also the sticking surface of the structure via the double double-faced adhesive sheets at the plurality of positions, and a position which is closest to the folded portion 203 from among the plurality of sticking positions is stuck with the high-bond strength adhesive sheet 822 having the highest-bond strength. In other words, when concentrating on the wiring 230 of the LED-FPC portion 210, the LED-FPC portion 210 having the LEDs 900 mounted thereon and having the wirings 230 each electrically connected at the one end to the LED 900 and terminated at the LED 900 is stuck and fixed to the FPC fixing surface 303, which is the sticking surface of the structure, and the exit plane 40b, which is also the sticking surface of the structure via the double-faced adhesive sheets at the plurality of positions. Therefore, the position which is closest to the other ends of the wirings 230 from among the plurality of sticking positions is stuck with the high-bond strength adhesive sheet 822 having the highest-bond strength.

In the configuration shown above, in the backlight unit 100 in this embodiment in which the LED-FPC portion 210 is stuck to the predetermined sticking surfaces, the following effects and advantages are demonstrated when peeling off the LED-FPC portion 210 from the predetermined sticking surfaces during rework.

For example, when entry of foreign substances was found in the light guide panel 40, and hence the rework to replace the light guide panel 40 is performed, the LED-FPC portion 210 which is stuck and fixed to the FPC fixing surface 303 and the exit plane 40b must be peeled off. In this case, since the LED-FPC portion 210 is connected to the liquid crystal panel 10 on the folded portion 203 side, it is peeled off from the side of the distal portion 211.

All the double-faced adhesive sheets disposed on the distal portion 211 side with respect to the LED 900, which is located at the position which is closest to the folded portion 203, are the low-bond strength adhesive sheets 821 which can be peeled off relatively easily. Therefore, since all the area of the LED-FPC portion 210 on which the LEDs 900 are mounted are stuck with the low-bond strength adhesive sheets 821, an excessive stress is not applied to the joint portions between the terminals of the LEDs 900 and the LED-FPC portion 210.

Although the high-bond strength adhesive sheet 822 having the high-bond strength is disposed to the position which is closest to the folded portion 203, when the position which is stuck with the high-bond strength adhesive sheet 822 is peeled off by pulling the distal portion 211 of the LED-FPC portion 210, since the portion near the joint portions between the terminals of the LEDs 900 and the LED-FPC portion 210 is already peeled, the corresponding position is not bent. Therefore, according to this embodiment, when peeling off the LED-FPC portion 210 from the predetermined sticking surfaces, an excessive stress is not applied to the joint portions between the terminals of the LEDs 900 and the LED-FPC portion 210, and hence separation or cracking does not occur at the joint portions.

In this embodiment, the portion which is closest to the folded portion 203 from among the plurality of sticking positions for sticking the LED-FPC portion 210 to the predetermined sticking surfaces is stuck with the high-bond strength adhesive sheet 822 having the highest-bond strength. A force to separate the LED-FPC portion 210 from the FPC fixing surface 303 by a reaction force of the folded portion 203 to be resiliently restored is applied to the portion near the folded portion 203 of the LED-FPC portion 210. However, in this embodiment, the portion near the folded portion 203 of the LED-FPC portion 210 is stuck with the high-bond strength adhesive sheet 822, it does not come apart due to the reaction force of the folded portion 203.

In the related art, the double-faced adhesive sheets having the same bond strength are used to stick the LED-FPC portion 210 to the predetermined sticking surfaces. However, in this case, when considering the stress applied to the joint portions between the LED-FPC portion 210 and the terminals of the LEDs 900 during rework, the bond strength of the double-faced adhesive sheets disposed in the vicinity of the folded portion 203 have to be lower as well, there arises a problem such that the LED-FPC portion 210 comes apart during normal use. In contrast, when the bond strengths of the double-faced adhesive sheets are increased to prevent the LED-FPC portion 210 from coming apart in the vicinity of the folded portion 203, there arises a problem such that an excessive stress is applied to the joint portions between the LED-FPC portion 210 and the terminals of the LEDs 900 during rework, and hence separation or cracking occurs at the joint portions.

However, according to the embodiment, the double-faced adhesive sheets which stick the LED-FPC portion 210 to the predetermined sticking surfaces are configured in such a manner that the bond strength of the double-faced adhesive sheet disposed at the position which is closest to the folded portion 203 becomes the highest. Therefore, as described above, the LED-FPC portion 210 does not come apart in the vicinity of the folded portion 203, and occurrence of separation or cracking at the joint portions between the LED-FPC portion 210 and the terminals of the LEDs 900 due to an excessive stress during rework is prevented. In other words, according to this embodiment, the stress to be applied to the LED-FPC portion 210 is well balanced by differentiating the bond strengths of the doable-faced adhesive sheets for sticking the LED-FPC portion 210 to the predetermined sticking surface in accordance with the position.

As regards the double-faced adhesive sheets for sticking the LED-FPC portion 210 to the predetermined sticking surfaces at the plurality of positions, the bond strength for sticking the LED-FPC portion 210 may be changed to a predetermined value by differentiating the surface areas to be stuck to the LED-FPC portion 210 depending on the position to be stuck. In this configuration, the stress to be applied to the LED-FPC portion 210 may be further preferably balanced.

Then, according to the liquid crystal display apparatus 500 provided with the backlight unit 100, the number of defective units to be wasted due to failed rework during the manufacturing process may be reduced and, consequently, the liquid crystal display apparatus may be manufactured at low cost.

Since the LED-FPC portion 210 does not come apart at the position close to the folded portion 203, positioning of the LEDs 900 with respect to the entrance plane 40a of the light guide panel 40 is not displaced. Therefore, generation of uneven luminance of the illumination light from the backlight unit 100 is prevented, and hence high display quality images are provided stably.

Figure 6:
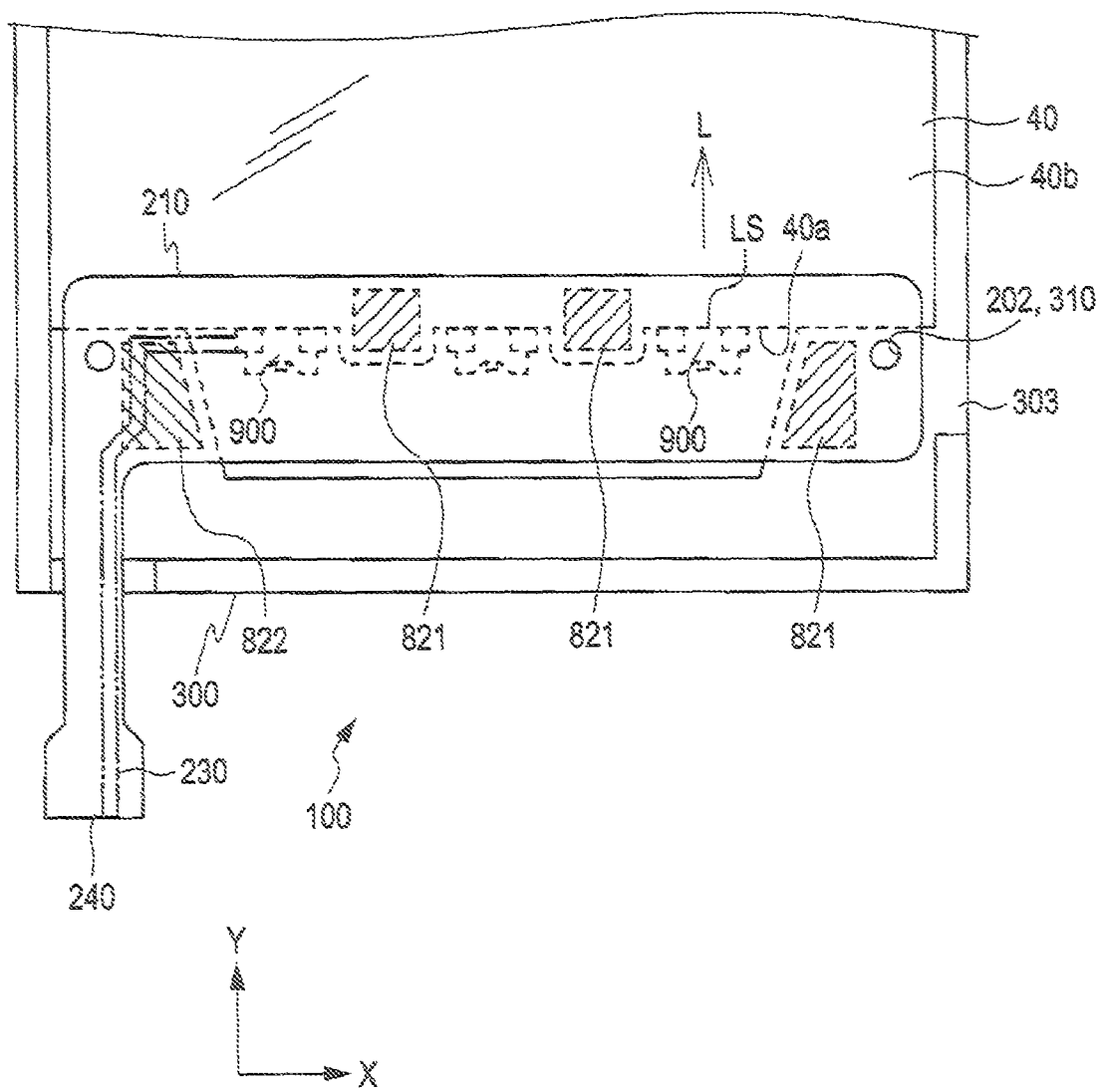
FIG. 6 is an explanatory drawing showing a modification of a first embodiment.

Although the LED-FPC portion 210 is formed integrally with the FPC 200 of the liquid crystal panel 10 in this embodiment, it may be provided separately from the FPC 200 as shown in FIG. 6. A configuration of this example will be described below as a modification.

According to the LED-FPC portion 210 in this modification, the ends of the wirings 230 on the opposite side of those electrically connected to the LEDs 900 are electrically connected to a connector section 240. Then, in this modification as well, the LED-FPC portion 210 having the wirings 230 each electrically connected at one end thereof to the LEDs 900 is stuck and fixed to the FPC fixing surface 303 and the exit plane 40b via the double-faced adhesive sheets at a plurality of positions as in the case of the first embodiment described in conjunction with FIG. 5, and a position which is closest to the other ends of the wirings 230 from among the plurality of sticking positions is stuck with the high-bond strength adhesive sheet 822 having the highest-bond strength.

In this manner, even though the LED-FPC portion 210 is not connected integrally with another member such as the liquid crystal panel 10, the connector section 240 of the LED-FPC portion 210 is connected to an LED illumination circuit in a state in which the backlight unit 100 is used in an assembled state. Therefore, since the LED-FPC portion 210 is bent at the position near the connector section 240 in this modification as well, a force to peel off the LED-FPC portion 210 is applied to the sticking position which is located at the position which is closest to the other ends of the wirings 230 which are each electrically connected at the one end to the LEDs 900 from among the plurality of sticking positions for sticking the LED-FPC portion 210 to the FPC fixing surface 303. When the LED-FPC portion 210 is peeled off from the predetermined sticking surfaces for rework, it is peeled off from the distal portion 211, which is the opposite side from the connector section 240.

Therefore, with this modification as well, the same advantages as the first embodiment are obtained.

Second Embodiment

Figure 7:
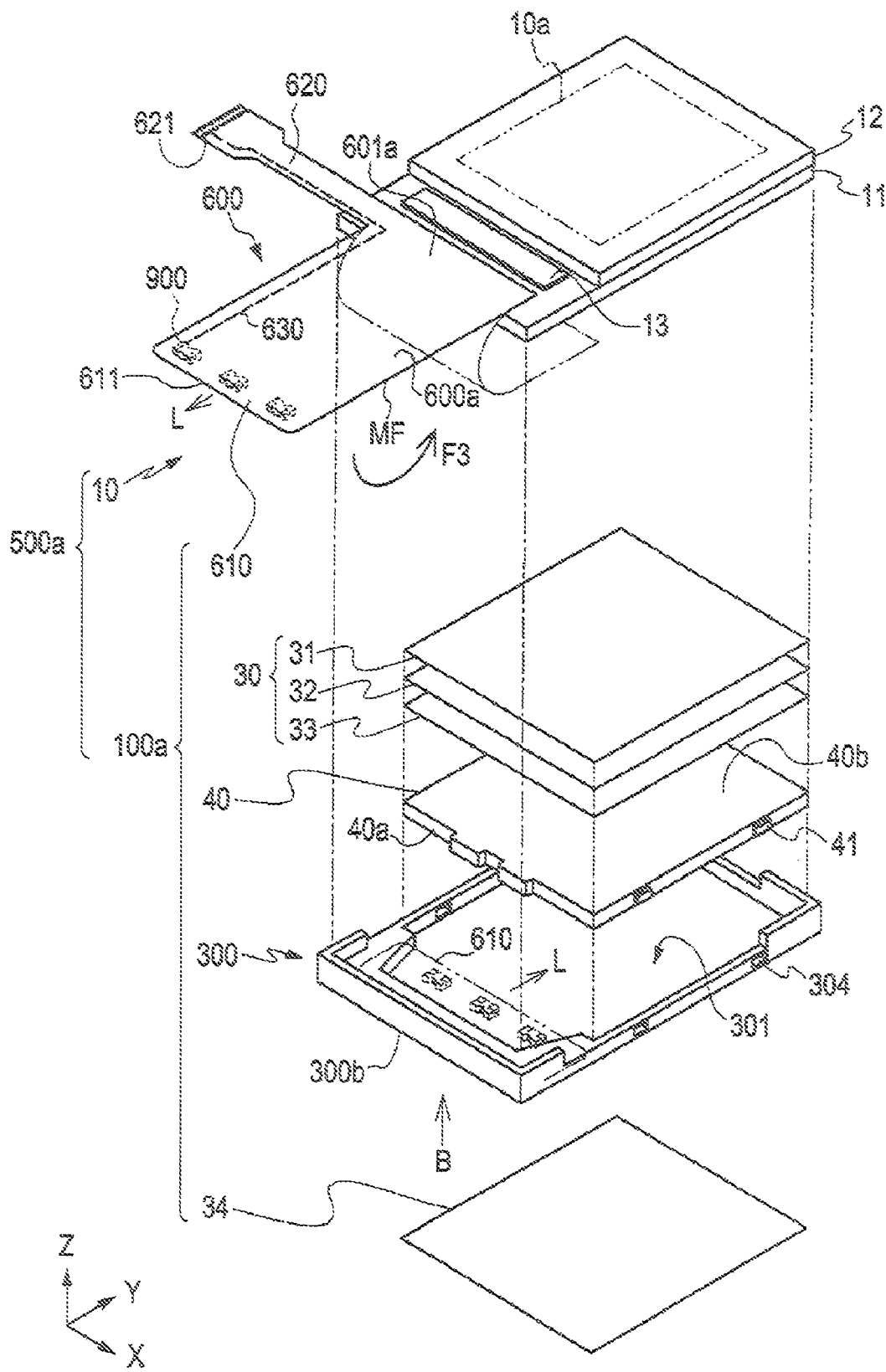
FIG. 7 is an exploded perspective view of the liquid crystal display apparatus according to a second embodiment.
Figure 8:
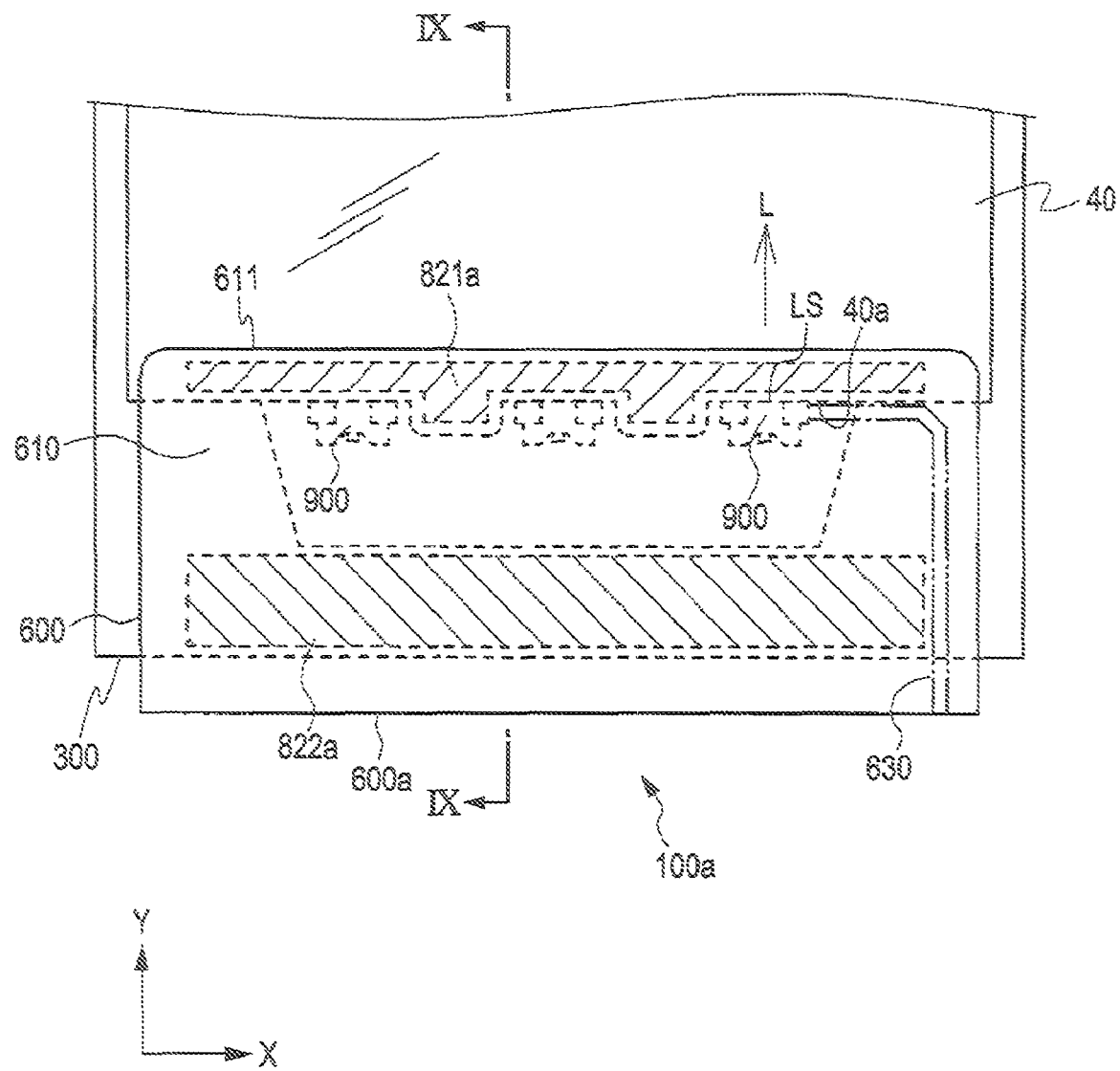
FIG. 8 corresponds to FIG. 7 viewed in the direction indicated by an arrow B.
Figure 9:
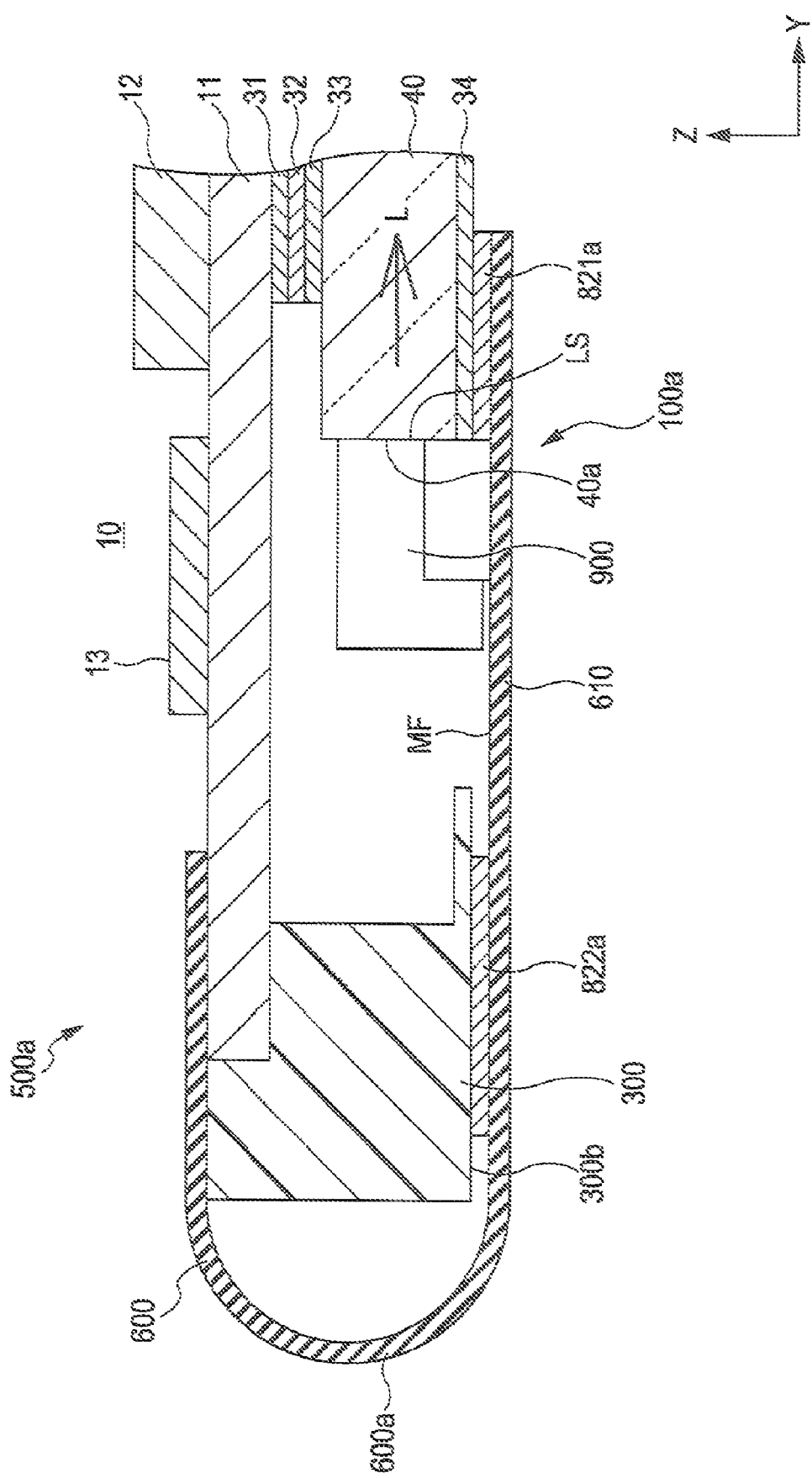
FIG. 9 is a cross-sectional view taken along the line IX-IX in FIG. 8.

Referring now to FIG. 7 to FIG. 9, a second embodiment of the invention will be described. FIG. 7 is an exploded perspective view of a liquid crystal display apparatus 500a according to the second embodiment. FIG. 8 is a drawing of the liquid crystal display apparatus 500a viewed in the direction of an arrow B. FIG. 9 is a cross-sectional view taken along the line IX-IX in FIG. 8.

The liquid crystal display apparatus 500a according to the second embodiment is different in fitting of an FPC 600 having the LEDs 900 as light source members mounted thereon and in configuration of sticking of the FPC 6000 to the predetermined sticking surfaces. In the following description, only these different points are described. The same components as in the first embodiment are represented by the same reference numerals, and the description thereof is omitted as needed.

The FPC 600 includes a terminal on a mount face MF of a proximal portion 601a on the liquid crystal panel 10 side, and the terminal is connected with the external connecting terminal of the liquid crystal panel 10 with isotropic conductive adhesive agent.

As shown in FIG. 7, the FPC 600 has a substantially L-shape including an LED-FPC portion 610 extending from the proximal portion 601a in parallel with the Y-axis in plan view, and extending in the direction away from the liquid crystal panel 10, and a connector section 620 extending from the proximal portion 601a in parallel with the X-axis in a state of being developed on an XY plane without being bent.

Three LEDs 900 are arranged mounted in one direction parallel with the X-axis on a mount face MF on a distal portion 611 of the LED-FPC portion 610. In this embodiment, in the state in which the FPC 600 is developed on the XY plane without being bent, the LEDs 900 are each mounted with the light-emitting surface LS of the LED 900 extending in substantially parallel with the XZ plane and facing the opposite direction from the proximal portion 601a on the liquid crystal panel 10 side of the FPC 600 as shown in FIG. 7. That is, in the state in which the FPC 600 is developed on the XY plane without being bent, the outgoing direction L of light emitted from the LEDs 900 is substantially parallel with the Y-direction, and also is a direction away from the liquid crystal panel 10.

On the other hand, an external connecting terminal of the liquid crystal panel 10 and an external connector terminal 621 electrically connected to the LED 900 of the LED-FPC portion 610 via the wiring are formed on a mount face MF at the distal portion of the connector section 620 of the FPC 600. The liquid crystal panel 10 and the LEDs 900 are electrically connected to and driven by the external device via the external connector terminal 621.

That is, a plurality of LED wirings 630, each electrically connected at one end to the LED 900 mounted on the mount face MF of the LED-FPC portion 610 and extended toward the connector section 620 from the one end, and electrically connected at the other end to the external connector terminal 621, which is a connecting path to be electrically connected to the outside.

The FPC 600 in this embodiment configured as described above is folded at a folded portion 600a so that the mount face comes inside (in the direction indicated by an arrow F3 in FIG. 7).

As shown in FIG. 8 and FIG. 9, the mount face MF of the distal portion 611 of the LED-FPC portion 610 is stuck to the surface of the reflection sheet 34 opposite from the reflecting surface with the low-bond strength adhesive sheet 821 as the both-faced adhesive sheets. An area of the LED-FPC portion 610 being closer to the folded portion 600a with respect to the LEDs 900 and overlapping with the frame 300 in plan view is stuck to the frame 300 via a high-bond strength adhesive sheet 822a as the double-faced adhesive sheet. In this state, the light-emitting surfaces LS of the LEDs 900 adhere to the entrance plane 40a of the light guide panel 40.

In this embodiment, predetermined sticking surfaces to which the LED-FPC portion 610 is stuck are areas of the back surface of the reflection sheet 34 and the back surface 300b of the frame 300 which overlap with the LED-FPC portion 610 when viewing the backlight unit 100a from the liquid crystal panel 10 side.

The low-bond strength adhesive sheets 821a and high-bond strength adhesive sheet 822a here demonstrate different bond strengths on the adhesive surface with respect to the LED-FPC portion 610, and the high-bond strength, adhesive sheet 822a demonstrates a higher-bond strength.

According to the backlight unit 100a in this embodiment having the configuration as described above, the LED-FPC portion 610 on which the LEDs 900 are mounted is stuck and fixed to the back surface of the reflection sheet 34 and the back surface 300b of the frame 300, which are the sticking surfaces of the structure via the double-faced adhesive sheets at a plurality of positions, and a position which is closest to the folded portion 600a from among the plurality of sticking positions is stuck with the high-bond strength adhesive sheet 822a having the highest-bond strength. In other words, when concentrating on the wiring 630 of the LED-FPC portion 610, the LED-FPC portion 610 having the LEDs 900 mounted thereon and having the wirings 630 each electrically connected at the one end to the LED 900 and terminated at the LED 900 is stuck and fixed to the reflection sheet 34 and the back surface 300b of the frame 300 via the double-faced adhesive sheets at the plurality of positions. Therefore, the position which is closest to the other ends of the wirings 630 from among the plurality of sticking positions is stuck with the high-bond strength adhesive sheet 822a having the highest-bond strength.

Therefore, in this embodiment as well, by peeling off the LED-FPC portion 610 from the distal portion 611 for rework, the same effects and advantages as the backlight unit 100 and the liquid crystal display apparatus 500 in the first embodiment are achieved. Therefore the description thereof is omitted.

The invention is not limited to the above-described embodiments, and various modifications may be made without departing from the scope or the spirit of the present invention which is understood from the appended claims and the entire description. Illumination devices and liquid crystal display apparatus including such modifications are included in the scope of the invention.

For example, in the above-described embodiments, the invention is applied to the backlight unit as the illumination device of the transmissive liquid crystal panel. However, it may also be applied to a front light unit which is an illumination device for illuminating a reflective liquid crystal panel from the observer side.

What is claimed is:

1. An illumination device comprising:
   a flexible wiring board;
   a light source mounted on the flexible wiring board;
   a structure having a light guide panel and a frame accommodating the light guide panel;
   a plurality of adhesive members that secure the wiring board to the structure at a plurality of adhesion areas located on the light guide panel or the frame;
   wherein the flexible wiring board includes a first portion that is bent in a first direction to overlap the light guide panel and the frame, and a second portion that extends away from the light guide panel and the frame and is bent in a second direction, the second direction being different from the first direction;
   the plurality of adhesive members includes at least two adhesive members that are formed where the first portion of the flexible wiring board overlaps the light guide panel or the frame, one of the two adhesive members being directly adjacent to the second portion; and
   a bond strength of the one adhesive member directly adjacent the second portion being greater than a bond strength of the other adhesive member that is not directly adjacent the second portion, in order to prevent excessive stress on the flexible wiring board during rework.

2. The illumination device according to claim 1, wherein the bond strength of the one adhesive member between the structure and the flexible wiring board disposed directly adjacent the second portion is greater than any of the other adhesive members.

3. The illumination device according to claim 1, each of the plurality of adhesive members includes a different bond strength between the flexible wiring board and the structure.

4. The illumination device according to claim 1, wherein each of the plurality of adhesive members include either a first bond strength or a second bond strength, the adhesive member disposed directly adjacent the second portion has the first bond strength, and the first bond strength is in a range from 15 to 20 N/20 mm according to 180° peel strength, and the second bond strength is in a range from 1 to 5 N/20 mm according to 180° peel strength.

5. The illumination device according to claim 1, wherein the adhesive members are adhered to a first face of the structure, and the flexible wiring board is bent toward a second face of the structure at the second portion.

6. A liquid crystal display apparatus comprising the illumination device according to claim 1.

7. The illumination device according to claim 1, wherein the adhesive members are double-faced adhesive sheets having different bond strengths.

8. The illumination device of claim 1, wherein said second direction is transverse to said first direction.

9. The illumination device of claim 8, wherein at least one of the plurality of adhesive members adhere the second portion to the light guide panel, and at least one of the plurality of adhesive members adhere the second portion to the frame.

10. The illumination device of claim 9, wherein the at least one adhesive member adhering the second portion to the light guide panel has a bond strength less than the at least one adhesive member adhering the second portion to the frame.

11. The illumination device of claim 8, wherein the light source is mounted to the second portion.

12. An electro-optical device comprising:
   a display device;
   a frame that supports said display device;
   a light guide panel disposed between said display device and said frame, said display device, said light guide panel, and said frame arranged relative to each other in a z-axis direction;
   a flexible wiring board fixed to said display device, said flexible wiring board including a first leg extending in a y-axis direction relative to said display device, and a second leg including at least one light source mounted thereon extending in an x-axis direction relative to said first leg;
   a plurality of adhesive members that secure the second leg to the frame and the light guide panel at a plurality of adhesion areas;
   wherein the second leg including said light source is bent in a first direction to overlap surfaces of said light guide panel and said frame directly adjacent said display device, and the first leg is bent in a second direction transverse to said first direction to secure the first leg to a surface of said frame opposite said display device;
   wherein the plurality of adhesive members include differing bond strengths, wherein adhesive members located at an end of said second leg distal from said first leg have a lower bond strength compared to an adhesive member located at an end of said second leg proximate said first leg in order to prevent excessive stress on the flexible wiring board during rework.

13. The electro-optical device according to claim 12, wherein the adhesive members are each double-faced adhesive sheets having different bond strengths.

* * * * *